United States Patent
Chiba et al.

(10) Patent No.: US 8,504,297 B2
(45) Date of Patent: Aug. 6, 2013

(54) MAP DISPLAY DEVICE AND MAP DISPLAY METHOD

(75) Inventors: Kazuomi Chiba, Iwaki (JP); Yukio Sato, Iwaki (JP)

(73) Assignee: Alpine Electronics, Inc, Tokyo (JP)

( * ) Notice: Subject to any disclaimer, the term of this patent is extended or adjusted under 35 U.S.C. 154(b) by 371 days.

(21) Appl. No.: 12/895,172

(22) Filed: Sep. 30, 2010

(65) Prior Publication Data

US 2011/0093195 A1 Apr. 21, 2011

(30) Foreign Application Priority Data

Oct. 21, 2009 (JP) ................................. 2009-242055

(51) Int. Cl.
*G01C 21/00* (2006.01)

(52) U.S. Cl.
USPC ........... 701/532; 701/411; 701/440; 701/457; 701/469; 340/995.15; 340/995.27

(58) Field of Classification Search
USPC ................ 701/400, 408–411, 420, 421, 440, 701/454, 457, 468, 469, 532, 533; 340/990, 340/995.1, 995.11, 995.14, 995.15, 995.19, 340/995.26, 995.27
See application file for complete search history.

(56) References Cited

U.S. PATENT DOCUMENTS

| | | | |
|---|---|---|---|
| 4,527,155 A | 7/1985 | Yamaki et al. | |
| 5,991,689 A * | 11/1999 | Aito et al. | 701/416 |
| 6,360,168 B1 * | 3/2002 | Shimabara | 701/436 |
| 6,363,161 B2 * | 3/2002 | Laumeyer et al. | 382/104 |
| 6,453,056 B2 * | 9/2002 | Laumeyer et al. | 382/104 |
| 6,565,610 B1 * | 5/2003 | Wang et al. | 715/210 |
| 6,710,774 B1 * | 3/2004 | Kawasaki et al. | 345/419 |
| 6,756,919 B2 * | 6/2004 | Endo et al. | 340/995.14 |
| 7,277,846 B2 * | 10/2007 | Satoh | 704/3 |
| 7,880,642 B2 * | 2/2011 | Gueziec | 340/905 |
| 8,073,876 B2 * | 12/2011 | Sumizawa et al. | 707/803 |
| 2002/0011941 A1 * | 1/2002 | Endo et al. | 340/995 |
| 2006/0279432 A1 * | 12/2006 | Mori | 340/990 |
| 2007/0021915 A1 * | 1/2007 | Breed et al. | 701/301 |
| 2008/0221786 A1 * | 9/2008 | Otsuki | 701/200 |
| 2008/0243378 A1 * | 10/2008 | Zavoli | 701/209 |

(Continued)

FOREIGN PATENT DOCUMENTS

| | | |
|---|---|---|
| JP | 05-061405 | 3/1993 |
| JP | 05-181414 | 7/1993 |

(Continued)

*Primary Examiner* — Russell Frejd
(74) *Attorney, Agent, or Firm* — Brinks Hofer Gilson & Lione

(57) ABSTRACT

A map display device that displays a map image around a vehicle position includes a display unit; a first storage unit storing map data including road data of a road and road-related information related to the road; a second storage unit storing adjustment data based on a relationship between display positions of the road data and the road-related information; and a map display control unit for calculating the display position of the road-related information based on the adjustment data for the individual road, and displaying the road-related information on a screen of the display unit. A road width to be displayed o the screen may be determined in accordance with the number of lanes and a road type. The adjustment data may be a distance between the display positions of the road and the road-related information, and may be determined in accordance with the road type and the road width.

18 Claims, 9 Drawing Sheets

U.S. PATENT DOCUMENTS

| | | | |
|---|---|---|---|
| 2008/0306684 A1* | 12/2008 | Yamazaki | 701/208 |
| 2009/0228204 A1* | 9/2009 | Zavoli et al. | 701/208 |
| 2010/0030462 A1* | 2/2010 | Iwaji et al. | 701/201 |
| 2010/0208937 A1* | 8/2010 | Kmiecik et al. | 382/100 |
| 2011/0122157 A1* | 5/2011 | Fabre et al. | 345/661 |
| 2012/0239296 A1* | 9/2012 | Schmitz | 701/538 |

FOREIGN PATENT DOCUMENTS

| | | |
|---|---|---|
| JP | 05-281903 | 10/1993 |
| JP | 07-168524 | 7/1995 |
| JP | 08-006496 | 1/1996 |

* cited by examiner

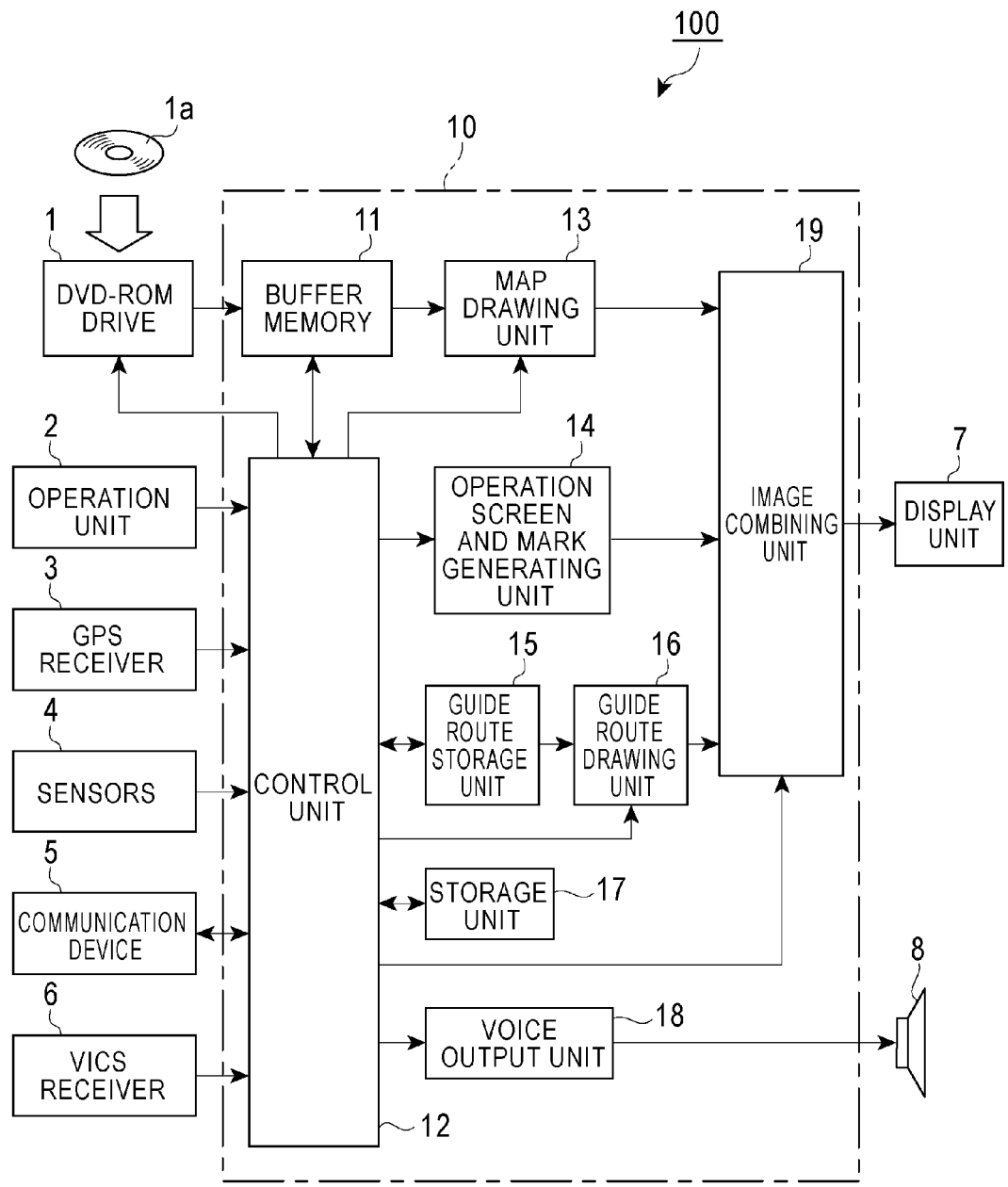

FIG. 6

|  | NUMBER OF LANES | ROAD WIDTH | SHIFTWIDTH OF STREET NAME |
|---|---|---|---|
| FC0 | 1 | 3 | 14 |
|  | 2 | 5 | 15 |
|  | 3 | 7 | 16 |
|  | 4 | 9 | 17 |
|  | 5- | 11 | 18 |
| FC1 | 1 | 3 | 14 |
|  | 2 | 5 | 15 |
|  | 3 | 7 | 16 |
|  | 4 | 9 | 17 |
|  | 5- | 11 | 18 |
| FC2 | 1 | 5 | 14 |
|  | 2 | 7 | 15 |
|  | 3 | 9 | 16 |
|  | 4 | 11 | 17 |
|  | 5- | 13 | 18 |
| FC3 | 1 | 3 | 13 |
|  | 2 | 5 | 14 |
|  | 3 | 7 | 15 |
|  | 4 | 9 | 16 |
|  | 5- | 11 | 17 |
| FC4 | 1 | 3 | 13 |
|  | 2 | 5 | 14 |
|  | 3 | 5 | 14 |
|  | 4 | 7 | 15 |
|  | 5- | 7 | 15 |

MAP DISPLAY DEVICE AND MAP DISPLAY METHOD

RELATED APPLICATIONS

The present application claims priority to Japanese Patent Application Number 2009-242055, filed Oct. 21, 2009, the entirety of which is hereby incorporated by reference.

BACKGROUND OF THE INVENTION

The present invention relates to a map display device and a map display method, and more particularly to a map display device and a map display method that have a function for displaying a street name at an optimal position in accordance with a road width.

DESCRIPTION OF THE RELATED ART

A typical on-vehicle navigation device of related art includes a control device, such as a CPU, that controls all processing related to navigation; a storage device, such as a digital versatile disk read only memory (DVD-ROM) or an integrated circuit (IC) memory card, that previously stores map data; a display device; a global positioning system (GPS) receiver; and detectors, such as a gyro and a vehicle speed sensor, that detect a current position and a current azimuth of a vehicle. The control device reads map data including the current position of the vehicle from the storage device. The control device causes the display device to display a map image around the vehicle position on a screen of the display device by using the map data. Also, the control device causes the display device to display a vehicle position mark indicative of the current position of the vehicle in a superposed manner on the map image, so that the map image is scrolled to follow travel of the vehicle, or the map image is fixed to the screen and the vehicle position mark is moved. Thus, a user can quickly recognize where the vehicle is currently traveling.

In addition, the on-vehicle navigation device typically has a guide function (route guide function) for allowing the user to easily travel to a destination without traveling on a wrong road. With the route guide function, the CPU uses the map data and searches an optimal route from a departure place (normally, a current position of the vehicle) to a destination by simulation of, for example, a breadth-first search or Dijkstra's algorithm. The searched route is stored as a guide route and the guide route is displayed on a map image during traveling such that the guide route can be distinguished from the other roads (for example, by changing the color or line width of the guide route). Also, when the vehicle approaches a position at a predetermined distance from an intersection in the guide route, at which the vehicle changes the course, a guide view of the intersection (for example, an enlarged view of the intersection, an arrow indicative of a travel direction of the vehicle at the intersection, a distance to the intersection, and an intersection name) is displayed on the map image. Thus, the user can recognize which road the user is traveling on, and which direction the user is to travel at the upcoming intersection.

Roads and facilities are displayed on the map image of the on-vehicle navigation device in accordance with map data. Also, names of the roads and facilities are displayed on the map image. Accordingly, the user can easily recognize the road and the position on the road where the vehicle is currently traveling, and facilities around the vehicle.

When the names are displayed, if the density of the names to be displayed varies depending on the scale of the map, the names may overlap with one another, or the name of a facility may overlap with another facility. The user may have difficulty in viewing the map, or the user may not effectively use the map.

One technique for providing easy viewing of a map display is detailed in Japanese Unexamined Patent Application Publication No. 05-061405, which describes a technique that uses previously determined names to be displayed in accordance with a display scale, and displays character strings indicative of the names with a uniform size regardless of the display scale.

Japanese Unexamined Patent Application Publication No. 07-168524 describes a technique that reads position coordinate information indicative of a display position of a character or a symbol on a map and font information from a storage location that is different from a storage location of map data, and displays the character or symbol without changing the size, even if the map is enlarged or reduced, so that the user easily recognizes the character or symbol.

Japanese Unexamined Patent Application Publication No. 05-181414 describes a technique that prepares multiple pairs of characters and display position data, where the characters include names of roads, names of intersections, etc., on a map. The technique displays a name such that characters of the name do not overlap a road display located near the current position.

Japanese Unexamined Patent Application Publication No. 05-281903 describes a technique that displays, for example, a name of a location on a map, by moving the name outside a predetermined angular range around a travel direction of a vehicle or in a direction that is opposite to the travel direction, to a position at which the name does not overlap a mark indicative of a current position.

Japanese Unexamined Patent Application Publication No. 08-006496 describes a technique that provides easy viewing of characters and symbols if a map is rotated by 90 degrees by rotating the characters and symbols by 90 degrees and compressing any characters that are converted into the form of vertical writing.

As described above, even when the map is enlarged and reduced, the characters and symbols are stored separately from the map data and the characters and symbols are displayed with a uniform size. Alternatively, the names of the facilities are displayed so as not to overlap one another. Thus, the techniques provide easy viewing of the map.

Meanwhile, a road width of a road to be displayed is previously defined in map data. The road with the road width is displayed on the basis of the definition. A display of a character or a symbol is effective for the predefined road width.

If the map data, for example, the road width is displayed recognizably, and in particular, if the road width is changed in accordance with the actual number of lanes of the road, a display of a name related to the road may overlap the road depending on the width of a line of the road. Thus, the user may have difficulty in viewing the display.

To address this, a definition may be determined in advance such that a display of a related name is changed if a road display is changed. However, the entire map data has to be updated to reflect the changed display. This update may take time and be troublesome.

SUMMARY OF THE INVENTION

The present invention is made to address the disadvantages of the related art, and an object of the present invention is to provide a map display device and a map display method that can change a display position of road-related information easily and efficiently without entirely updating the map data.

To address the disadvantages of the related art, according to an aspect of the present invention, a map display device that displays a map image around a vehicle position is provided. The map display device includes a display unit; a first storage unit storing map data including road data of a road and road-related information related to the road; a second storage unit storing adjustment data indicative of a relationship between a display position of the road data and a display position of the road-related information; and a map display control unit for calculating the display position of the road-related information related to the road on the basis of the adjustment data for the individual road, and displaying the road-related information on a screen of the display unit.

In the map display device according to this aspect, a road width of the road displayed on the screen of the display unit may be determined in accordance with the number of lanes and a road type of the road. The adjustment data may be a distance between the display position of the road and the display position of the road-related information, and may be determined in accordance with the road type and the road width of the road.

In the map display device according to the aspect, the map display control unit may extract a distance between a reference line for displaying the road-related information in accordance with the road type and the road width of the road and a reference line of the road from the adjustment data stored in the second storage unit, and may calculate the display position of the road-related information in accordance with the distance. The reference line for displaying the road-related information may be a center line of a display frame for a region in which the road-related information is displayed, with the center line being parallel to the road that corresponds to the display frame. Alternatively, the reference line for displaying the road-related information may be a side of a display frame for a region in which the road-related information is displayed, with the side being parallel to the road that corresponds to the display frame and being near the road. The reference line of the road may be a center line of the road. Alternatively, the reference line of the road may be a side of the road, with the side being parallel to the display frame and being near the display frame.

According to another aspect of the present invention, a map display method performed in the map display device according to the above aspect is provided. The map display method according to this aspect generates a map image by using map data that includes map character data. The map character data may include a street name, and adjustment data indicative of a relationship between a display position of a street name and a display position of a road. The method includes the steps of detecting a current vehicle position; extracting the map data around the vehicle position; acquiring the adjustment data indicative of the relationship between the display position of the road data and the display position of the road-related information included in the map data; calculating the display position of the road-related information related to the road on the basis of the adjustment data in accordance with the road width; and generating the map image including the road-related information on the basis of the calculated position, and displaying the map image on a screen of a display unit.

In the map display method according to this aspect, the calculation for the display position of the road-related information related to the road on the basis of the adjustment data in accordance with the road width may include the steps of extracting a distance between a reference line for displaying the road-related information in accordance with a road type and a road width of the road and a reference line of the road from the adjustment data stored in a storage unit, and calculating the display position of the road-related information in accordance with the distance. The reference line for displaying the road-related information may be a center line of a display frame for a region in which the road-related information is displayed, the center line being parallel to the road that corresponds to the display frame. Alternatively, the reference line for displaying the road-related information may be a side of a display frame for a region in which the road-related information is displayed, with the side being parallel to the road that corresponds to the display frame and being near the road. The reference line of the road may be a center line of the road. Alternatively, the reference line of the road may be a side of the road, with the side being parallel to the display frame and being near the display frame.

With the map display device and the map display method according to the aspects of the present invention, the display position of the road-related information may be calculated on the basis of the adjustment data information (shift width) indicative of a distance by which the road-related information stored in association with the road data that is shifted from the road when the map is displayed. The road-related information may be displayed on the basis of the calculation result. Accordingly, even if the road width is changed to the road width defined on the basis of the road type and the number of lanes of the road, the display of the road-related information does not overlap the road. The map display can be easily viewed.

In addition, since the shift width is defined in association with the road, the display position of the road-related information may be determined and the road-related information may be displayed at the determined position when the map is displayed. The map data does not have to be entirely updated. The road-related information can be easily and quickly displayed at the optimal position.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 1 is a block diagram showing a configuration of an on-vehicle navigation device having a function of a map display device according to an embodiment of the present invention;

FIG. 6 is a table showing a relationship between the number of lanes of a road and a shift width for a display position of the street name for each road type;

DESCRIPTION OF THE PREFERRED EMBODIMENTS

Figure 2A:
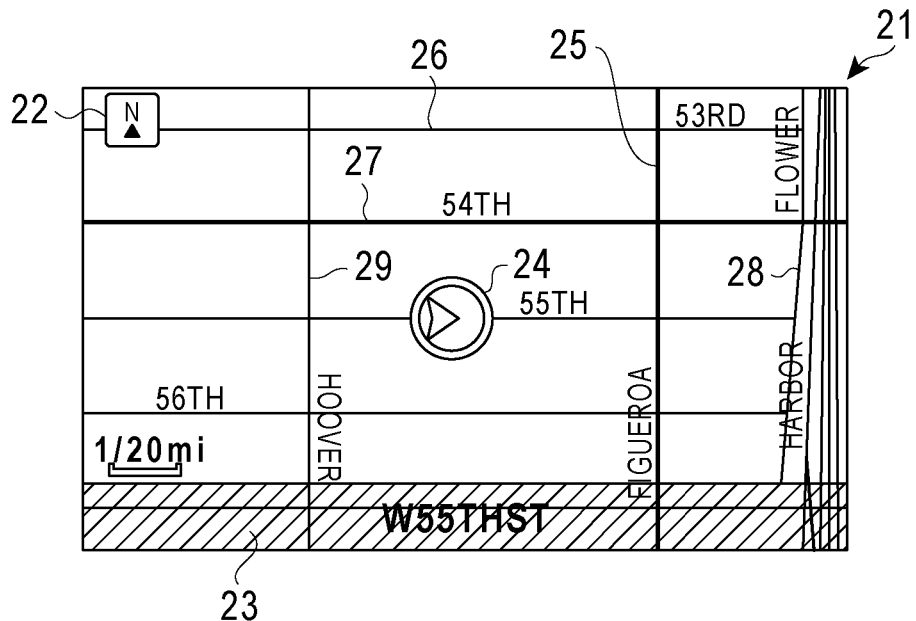
FIGS. 2A and 2B illustrate an exemplary map display when road widths are not changed in accordance with road types (FIG. 2A), and an exemplary map display when the road widths are changed in accordance with the road types (FIG. 2B) as compared with the map display in FIG. 2A.

An embodiment of the present invention will be described below with reference to the attached drawings.

Configuration of On-Vehicle Navigation Device

FIG. 1 is a block diagram of an embodiment for a map display device of the present invention showing a configuration of an on-vehicle navigation device 100 having a function of a map display device.

Referring to FIG. 1, a DVD-ROM drive 1 is illustrated. A storage medium stores map data and guide data. In this embodiment, the storage medium that stores such data is a DVD-ROM 1*a*. However, a hard disk or another storage medium may be used. The map stored in the DVD-ROM 1*a* is divided into longitude widths and latitude widths with proper sizes depending on scales, for example, 1/12500, 1/25000, 1/50000, and 1/100000. Various objects including roads, buildings, and facilities in the map are stored as sets of coordinates of nodes, which are expressed with the longitude and latitude. The map data includes (1) a road layer having a road list, a node table, an intersection-nodes list, etc., (2) a background layer for displaying roads, buildings, parks, rivers, etc., on a map image, and (3) a characters-and-symbols layer for displaying characters and map symbols to identify names of administrative districts like municipal districts, street names, intersection names, etc.

The DVD-ROM 1*a* also stores road data that expresses shapes of roads that are used for map matching. The road data includes links between shape nodes. Distances between the nodes differ from one another in accordance with the shapes of the roads.

An operation unit 2 includes operation buttons and the like for operating a navigation device body 10. In this embodiment, the operation unit 2 includes a remote-controller transmitter. A user may operate the navigation device body 10 by using the remote-controller transmitter.

A GPS receiver 3 receives GPS signals transmitted from a plurality of GPS satellites; generates GPS data including a longitude and a latitude of a current position of a vehicle, and GPS data including position dilution of precision (position DOP, PDOP) and a horizontal position dilution of precision (HDOP); and outputs the GPS data.

Various sensors 4 include a self-contained navigation sensor, an acceleration sensor, and a steering-angle sensor. The self-contained navigation sensor includes an angle sensor such as a gyro that detects a rotation angle of a vehicle, and a travel distance sensor that generates a pulse every predetermined travel distance. The acceleration sensor detects whether the brakes are in a state of operation. The steering-angle sensor detects whether the steering wheel is in a state of operation.

A communication device 5 is, for example, a mobile phone for communication between the user and various service centers. A vehicle information and communication system (VICS) receiver 6 receives information from radio beacons or optical beacons. These beacons are provided at roadsides. The beacons are connected with police offices, road administrators, and an integrated center.

A display unit 7 is, for example, a liquid crystal panel. The navigation device body 10 causes the display unit 7 to display a map around a current position of the vehicle, a guide route from a departure place to a destination, a vehicle mark, and other guide information. The display unit 7 includes a touch panel on a screen thereof. The touch panel includes various buttons corresponding content being displayed on a screen. The touch panel also serves as an input device to select menus in the form of various buttons. A speaker 8 provides guide information to the user with voice.

The navigation device body 10 includes following components. A buffer memory 11 temporarily stores the map data read from the DVD-ROM 1*a* through the DVD-ROM drive 1.

A control unit 12 is a microcomputer including a navigation program. Under the program, the control unit 12 executes various processing including calculating a current position of the vehicle by using a signal output from the GPS receiver 3 and a signal output from the self-contained navigation sensor included in the various sensors 4; reading map data to be displayed from the DVD-ROM 1*a* through the DVD-ROM drive 1 and providing the read map data to the buffer memory 11; and searching a guide route from a departure place to a destination to meet a search condition determined with the map data in the buffer memory 11. In this embodiment, the control unit 12 has a function of a map display control unit. When the control unit 12 causes a screen of the display unit 7 to display a road and a street name related to the road, the control unit 12 adjusts a distance between a display position of the road and a display position of the street name etc., and determines the display positions. Thus, the control unit 12 performs processing for displaying a map that can be easily viewed.

A map drawing unit 13 generates a map image by using the map data in the buffer memory 11. An operation screen and mark generating unit 14 generates various menu screens (operation screens) in accordance with operated states, a vehicle position mark, and various marks such as cursors.

A guide route storage unit 15 stores the guide route searched by the control unit 12. A guide route drawing unit 16 draws a guide route. The guide route storage unit 15 stores all nodes in the guide route searched by the control unit 12, from the departure place to the destination. The guide route drawing unit 16 reads guide route information from the guide route storage unit 15 when the map is displayed, and draws the guide route with a color and a line width different from those of the other roads.

A storage unit 17 is, for example, a hard disk. The storage unit 17 stores data for adjusting, for example, a position of a street name with respect to a position of a road displayed on a screen of the display unit 7.

A voice output unit 18 supplies the speaker 8 with a voice signal on the basis of a signal from the control unit 12. An image combining unit 19 superposes the various marks and the operation screen generated by the operation screen and mark generating unit 14, and the guide route drawn by the guide route drawing unit 16 on the map image drawn by the map drawing unit 13. The resultant map image is displayed on the display unit 7.

Described next is a display of a map image when the widths of roads are changed in accordance with road types by the on-vehicle navigation device 100 with the above configuration.

FIG. 2A illustrates an example of a map image 21 that is displayed on the screen of the display unit 7 when the widths of roads are not changed in accordance with the numbers of lanes of the roads. Roads (25, 26, 27, 28, and 29) with different widths in accordance with road types, a vehicle position mark 24 indicative of a current position of the vehicle, an azimuth mark 22, and a state display section 23 are displayed on the map image 21 in FIG. 2A. The state display section 23 indicates that the vehicle currently travels to the west along the 55th street (W 55TH ST). Referring to FIG. 2A, the roads 25 and 27 have higher-level road types (also referred to as function class, FC) than the road 26. Hence, the roads 25 and 27 are displayed with lines thicker than the line of the road 26. If the widths of the roads are not changed in accordance with the numbers of lanes of the roads, the street names (54TH, etc.) are displayed generally at distances from the roads to prevent the street names from overlapping the display of the roads.

Figure 2B:
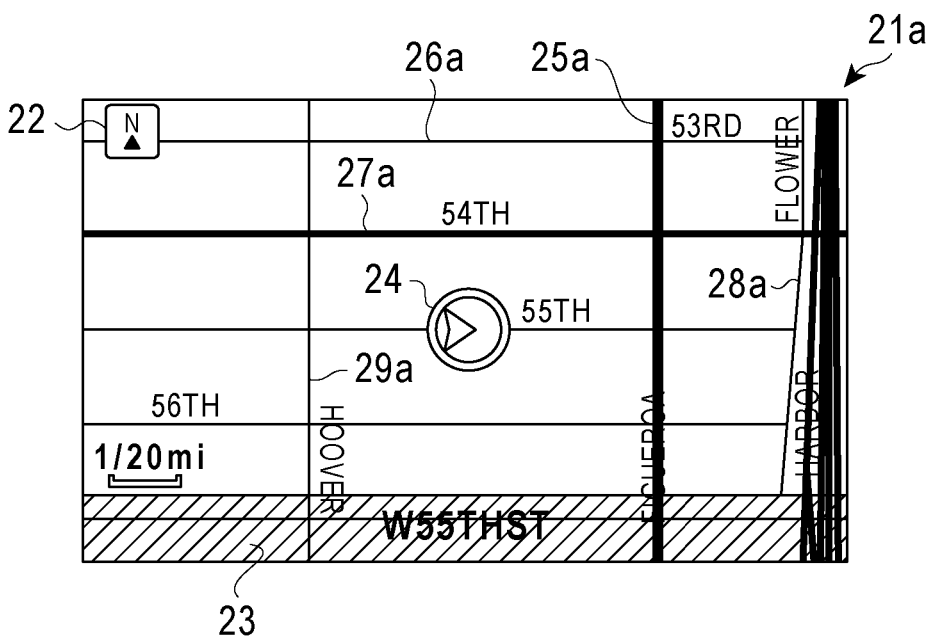

FIG. 2B illustrates an example of a map image when the widths of roads are changed in accordance with the road types (thus, the roads 25, 26, 27, 28, and 29 are changed to roads 25*a*, 26*a*, 27*a*, 28*a*, and 29*a*), as compared with the state in FIG. 2A. The street names are data independent from data of the roads. Even if the widths of the roads are changed, the display positions of the street names are not changed. Thus, a road may overlap a street name depending on the width of the road, or a street name may be too far from a road.

In FIG. 2B, the positional relationship between the road 28*a* and its street name "FLOWER" is proper. However, the road 25*a* overlaps its street name "FIGUEROA," and the road 29*a* is too far from its street name "HOOVER."

Figure 3A:
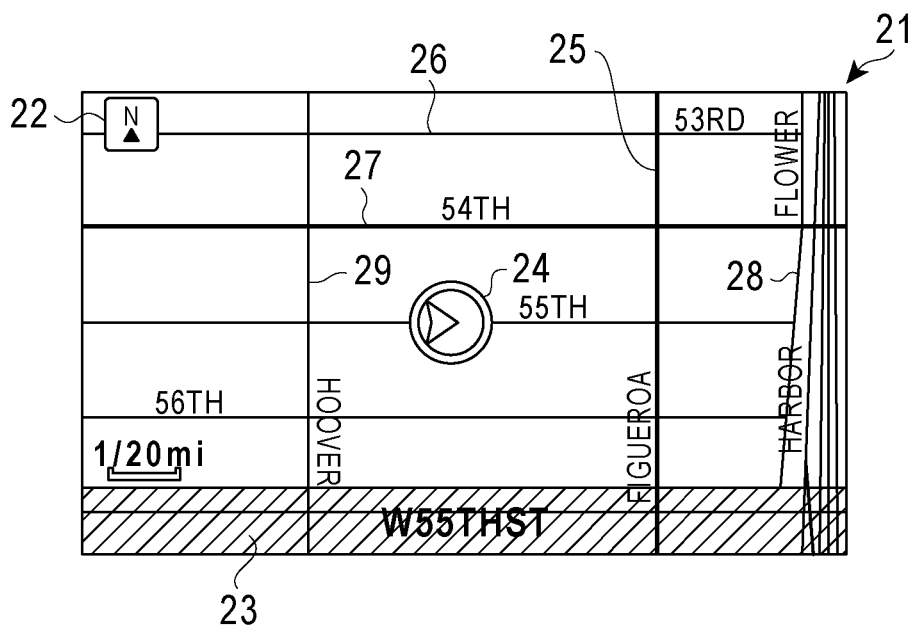
FIGS. 3A and 3B illustrate an exemplary map display when the road widths are not changed in accordance with road types, and an exemplary map display when the road widths are changed in accordance with the road types and when street names are displayed at optimal positions.
Figure 3B:
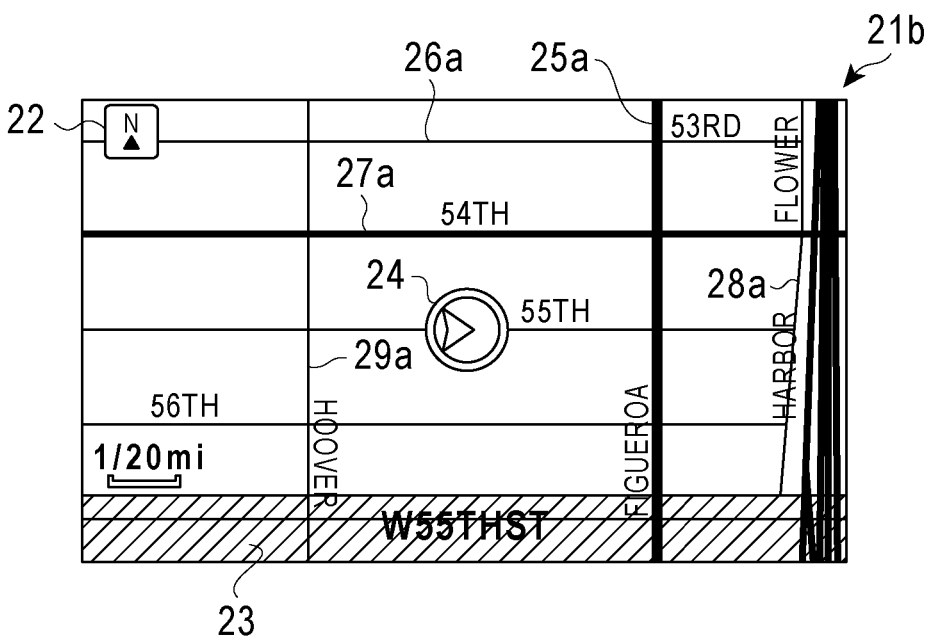

FIGS. 3A and 3B illustrate an example in which a street name is displayed at a proper position such that a street name does not overlap a road or is not too far from the road when the widths of the roads are changed in accordance with the road types. FIG. 3A is the same figure as FIG. 2A, and illustrates a map image when the widths of roads are not changed in accordance with the numbers of lanes of the roads. FIG. 3B illustrates a map image when the widths of the roads are changed in accordance with the numbers of lanes of the roads, as compared with the map image in FIG. 3A. Referring to FIG. 3B, the street name "FIGUEROA," which overlaps the road in FIG. 2B, is separated from the road, and the street name "HOOVER," which is too far from the road in FIG. 2B, is displayed at a proper distance from the road.

Figure 4A:
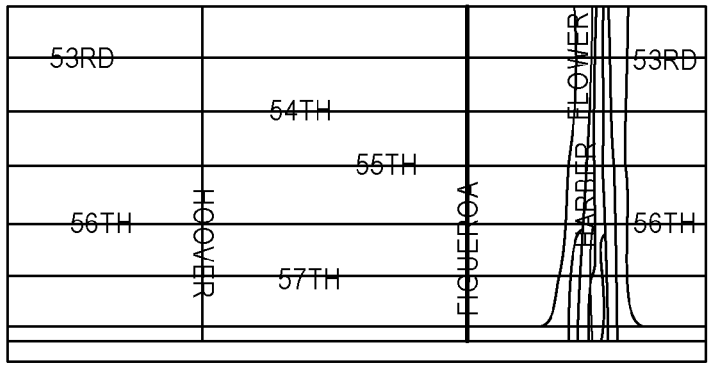
FIGS. 4A and 4B each illustrate a configuration of a road database.
Figure 4B:
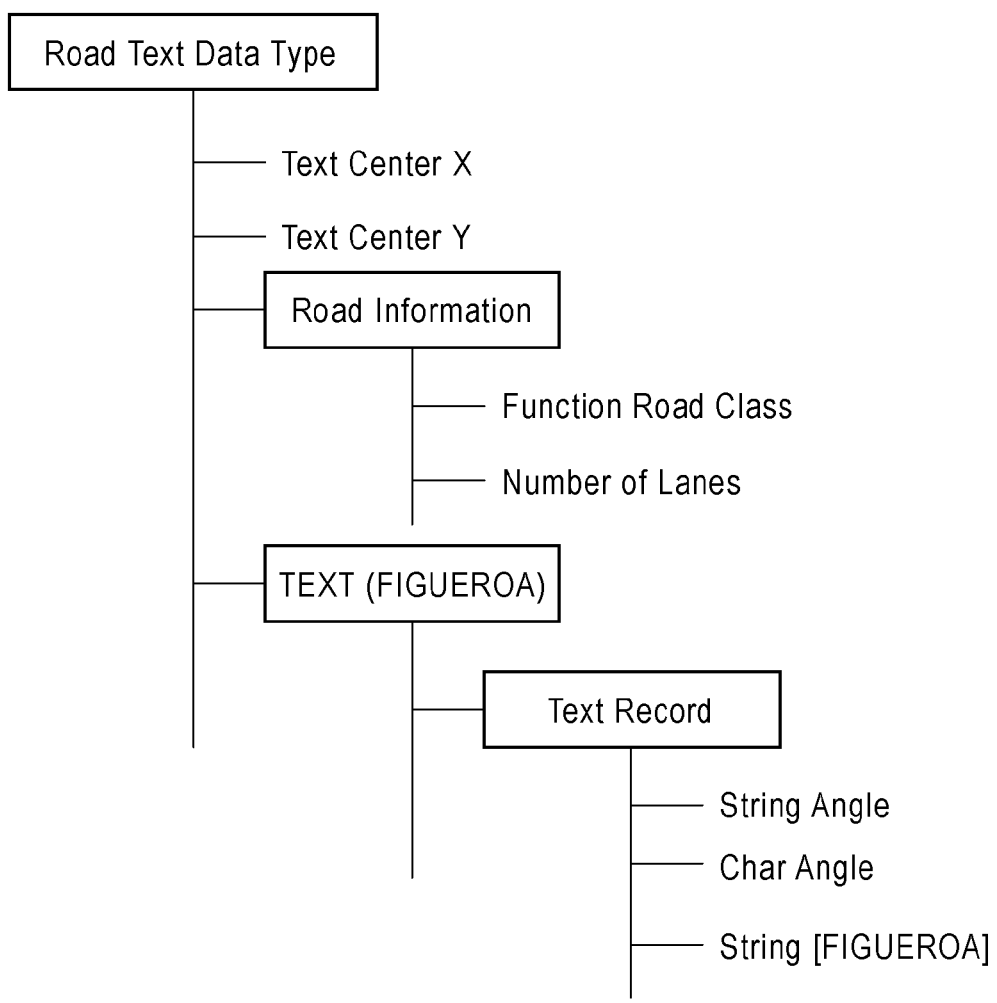

Optimization processing for the display position of the street name will be described below with reference to the drawings. FIGS. 4A and 4B each illustrate a primary configuration of a road database. FIG. 4A illustrates part of the content of the map database. The map database includes roads and street name information. FIG. 4B illustrates part of a directory structure of information data related to a street name.

The road layer in the map data includes road link data, node data, and intersection data. The road link data is data related to roads that connect intersections with one another. The road link data includes node data indicative of longitudes and latitudes of a start point and an end point of a road, a road type (national road, highway, prefectural road, other local road and street), the number of nodes that form a link, a street name, a road width, and the number of lanes of a road, for each link that forms a road.

In the United States, the road types are classified into five function classes (FC0 to FC4) based on the road network by Navigation Technologies. FC0 corresponds to Super Highways, FC1 corresponds to Highways, FC2 corresponds to Collector Roads, FC3 corresponds to Feeder Roads, and FC4 corresponds to Local Streets.

Referring to FIG. 4B, the information related to the display of the street is written in a Road Text Data Type directory, as data, for example, in the form of files. The Road Text Data Type directory includes a Road Information directory and a TEXT directory, and has a Text Center X file and a Text center Y file. The Text Center X file and the Text center Y file respectively indicate an X coordinate and a Y coordinate of the center of a text (street name).

The Road Information directory saves data of road information, and has a Function Road Class file and a Number of Lanes file. The Function Road Class file saves a road type, and the Number of Lanes file saves the number of lanes of a road.

The TEXT directory further includes a Text Record directory. The Text Record directory has a String Angle file, a Char Angle file, and a String file. The String Angle file saves an angle of a street name string to be displayed, the Char Angle file saves an angle of characters of the street name to be displayed, and the String file saves a string of the street name to be displayed. In FIG. 4B, FIGUEROA is saved as the string of the street name.

Figure 5A:
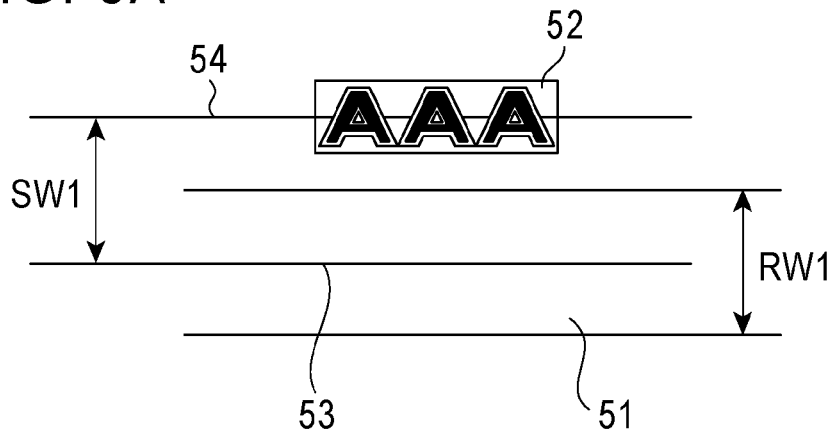
FIGS. 5A to 5C each illustrate a relationship between a display position of a road and a display position of a street name.
Figure 5B:
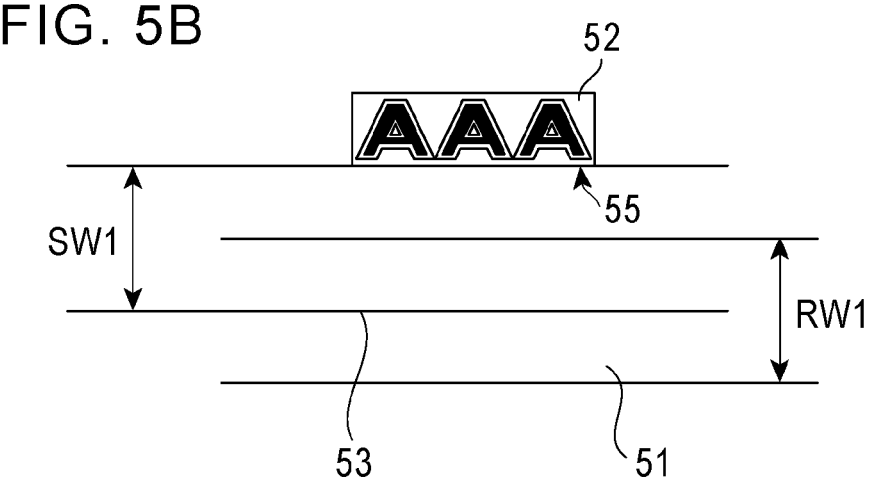
Figure 5C:
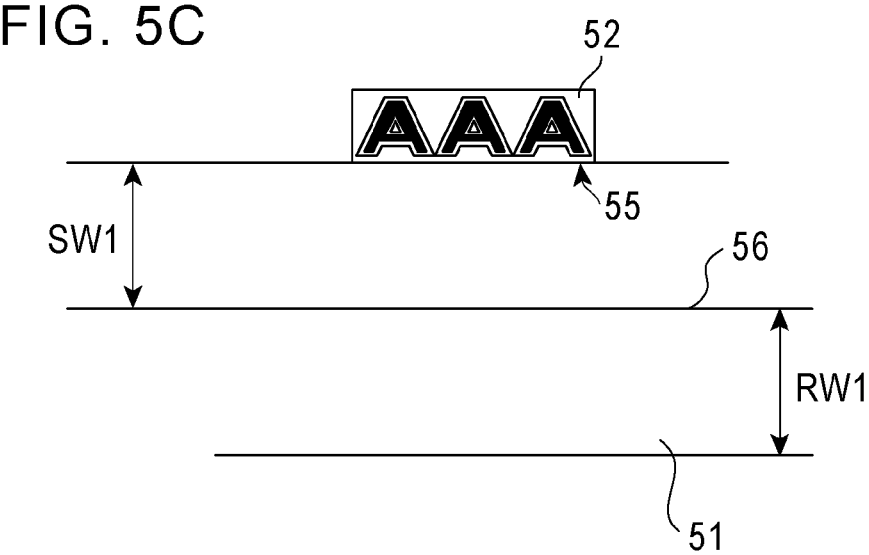

FIGS. 5A to 5C each illustrate calculation of a display position of a street name. In FIG. 5A, a center line 53 of a road 51 (with a road width of RW1) serves as a reference line of the road 51, and a center line 54 of a display frame 52 for a street name serves as a reference line for displaying the street name, the center line 54 being parallel to the road 51.

The street name is displayed within the display frame 52 for the street name. The XY coordinates of the center of the display is previously defined as shown in FIG. 4B. For example, if a road is parallel to the X direction, the X coordinate of the center of the display position of the street name is the same as the defined X coordinate, and the Y coordinate thereof is obtained by adding a shift width SW1 to the Y coordinate of the center line 53 of the road 51. Thus, by calculating the display position of the street name, the street name is displayed at a proper position without overlapping the display of the road.

The display frame 52 for the street name is a region in which the string of the street name is displayed. The display frame 52 may be displayed or may not be displayed when the map is displayed.

In FIG. 5B, the center line 53 of the road 51 serves as the reference line of the road 51, and a side 55 of the display frame 52 for the street name serves as a reference line for displaying the street name, the side 55 being parallel to the road 51 and being near the road 51. Calculation for the display position of the street name is similar to that in FIG. 5A.

The shift width for the street name from the road is the shift width SW1 from the center line 53 of the road 51 to the lower end of the display frame 52 for the street name. Thus, even if the font size of the string displayed within the display frame 52 for the street name is changed, the shift width SW1 of the street name does not have to be corrected.

In FIG. 5C, a side 56 of the road 51 serves as a reference line of the road 51, the side 56 being parallel to the display frame 52 and being near the display frame 52 for the street name, and the side 55 of the display frame 52 for the street name serves as the reference line of the street name, the side 55 being parallel to the road 51 and being near the road 51. Calculation for the display position of the street name is similar to that in FIG. 5A.

The shift width for the street name from the road is the shift width SW1 from the side 56 of the road 51 to the lower end of the display frame 52 for the street name. Thus, even if the drawn width of the road 51 is changed, the shift width SW1 of the street name does not have to be corrected. Also, even if the font size of the string to be displayed within the display frame 52 for the street name is changed, the shift width SW1 of the street name does not have to be corrected.

FIG. 6 is a table showing a relationship between the number of lanes of a road and a shift width for a display position of a street name for each road type. The table showing this relationship is stored in the storage unit 17. Referring to FIG. 6, a road width corresponding to the number of lanes and a shift width for a street name in accordance with the road width are defined for each road type. For example, in a case of a road with a function class FC3, if the number of lanes is five or more, it is defined that the road width is 11 dots and the shift width for a street name in this case is 17 dots.

Next, a map display method performed in the map display device according to this embodiment will be described. Processing for calculating a display position of road-related information in the map display method will be described in detail below with reference to flowcharts shown in FIGS. 7 and 8.

Figure 7:
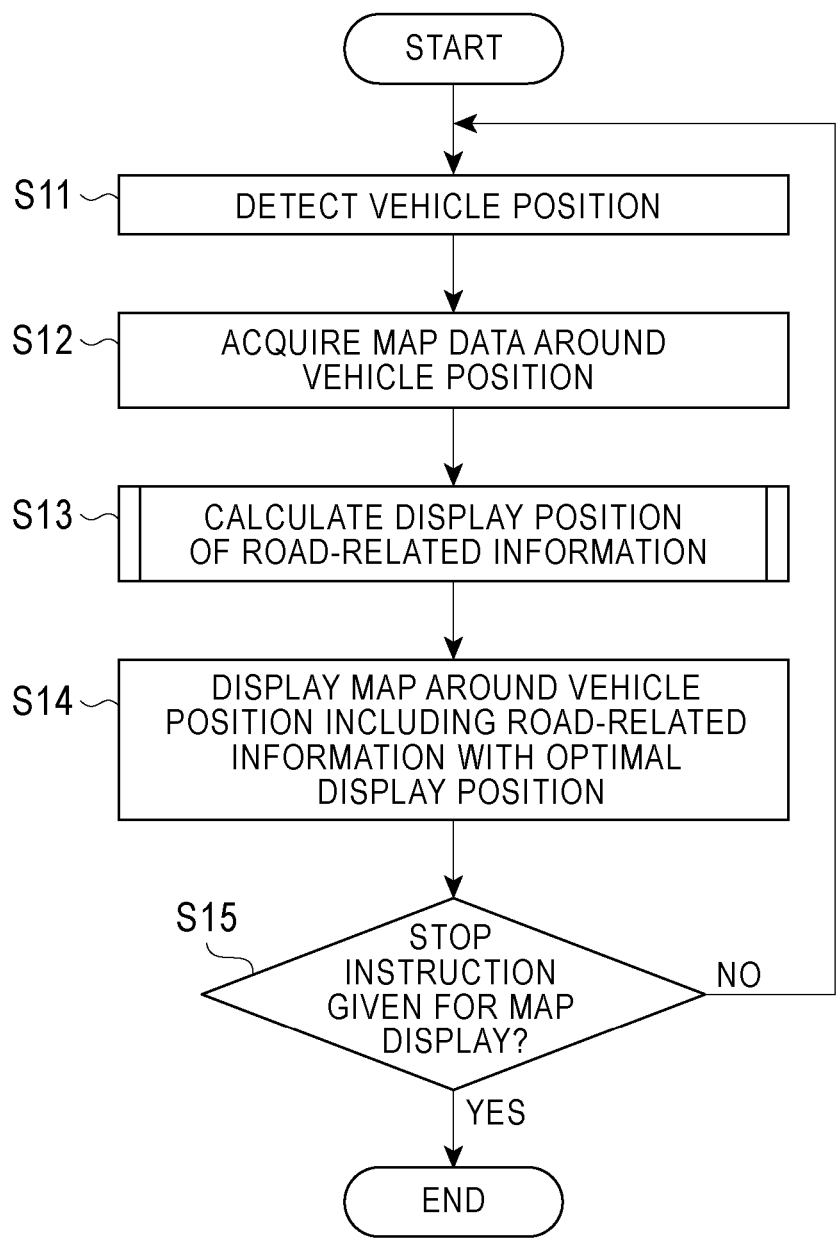
FIG. 7 is a flowchart showing an exemplary process for displaying a map in the map display device in FIG. 1.
Figure 8:
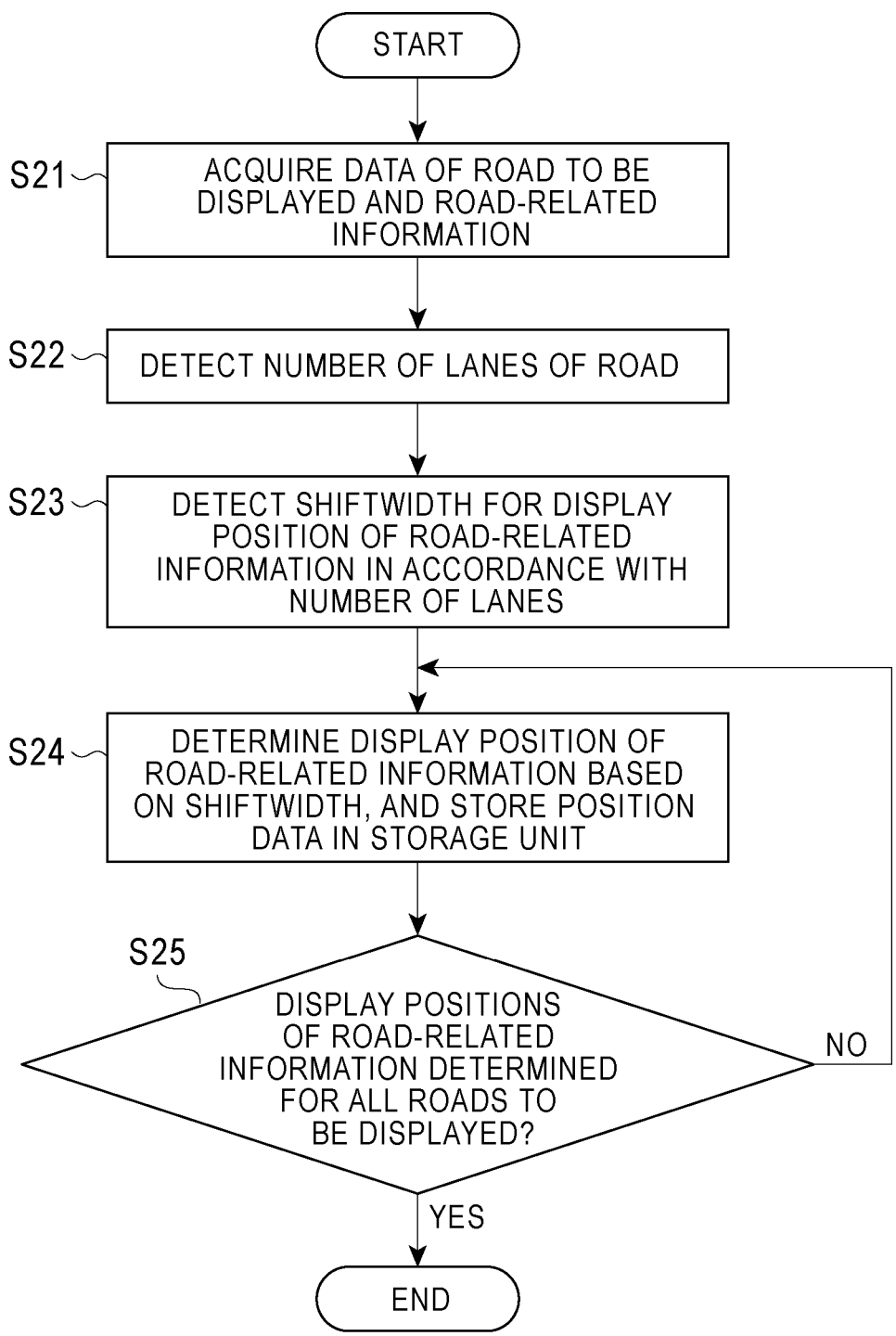
FIG. 8 is a flowchart showing an exemplary process for calculating a display position of road-related information in the flowchart of FIG. 7.

FIG. 7 is a flowchart showing exemplary processing for displaying a map around a vehicle position. FIG. 8 is a flowchart showing exemplary processing for calculating a display position of road-related information.

In step S11 in FIG. 7, a vehicle position is detected by using a signal from the GPS receiver 3.

In step S12, map data around the vehicle position is acquired. The map data corresponding to a range to be displayed on a screen with a predetermined scale is extracted from map data stored in the DVD-ROM 1a.

In step S13, a display position of road-related information is calculated. Processing for calculating the display position will be described in more detail below.

In step S14, a map around the vehicle position including the road-related information at the optimal display position is displayed on the display screen.

In step S15, it is determined whether a stop instruction is given for the map display. If the stop instruction for the map display is given as a result of that, for example, an engine stops, or the user changes the display, the processing is ended. If no instruction is given, the processing returns to step S11, and continuously performs the processing for displaying the map around the vehicle position.

FIG. 8 illustrates the exemplary processing for calculating the display position of the road-related information. In step S21 in FIG. 8, data of a road to be displayed and data of road-related information related to the road are acquired.

In step S22, the number of lanes of the road is detected. The number of lanes is previously stored in part of the map database, as road information data of the map data.

In step S23, a shift width for the display position of the road-related information corresponding to the number of lanes of the road detected in step S22 is detected. The shift width is previously defined in accordance with the road type and the number of lanes of the road (width), and is stored in the storage unit 17.

In step S24, the display position of the road-related information is calculated on the basis of the shift width acquired in step S23. The position data is stored in the storage unit 17.

In step S25, it is determined whether display positions of road-related information have been determined for all roads to be displayed. If the display positions of the road-related information have been determined not for all roads, the processing returns to step S24, and the display positions are continuously calculated. If the display positions for all roads to be displayed have been determined, the processing is ended, and the processing goes to step S14 in FIG. 7.

As described above, with the map display device and the map display method according to this embodiment, when the map is displayed, the display position of the road-related information is calculated by using adjustment data information (shift width) indicative of a distance by which the road-related information stored in association with the road data is shifted from the road. The road-related information is displayed on the basis of the calculation result. Accordingly, even if the road width is changed to a road width defined in accordance with a road type and the number of lanes of the road, the display of the road-related information does not overlap the road. Thus, the map can be easily viewed.

The position adjustment data for displaying the road-related information (street name etc.) defined such that the shift width is associated with the road is stored separately from the map data. Hence, the display position of the road-related information is determined when the map is displayed, and the road-related information is displayed at the determined position. The map data does not have to be entirely updated. The road-related information can be displayed at the optimal position easily and quickly.

In the above embodiment, the display position of the road-related information is calculated with reference to the position adjustment data and is displayed every time when the map around the vehicle position is displayed. Also, the map may be displayed, and updated data for the display position of the road-related information may be reflected on the map data. Then, the updated data may be re-used when the map for the same region is displayed. In this case, the calculation for changing the position of the road-related information can be omitted.

In the above embodiment, the adjustment for the display position of the street name as the road-related information has been described. However, it is not limited thereto. The road-related information may include an intersection name, a road sign (icon figure indicative of a road number), etc., as long as the information relates to a road.

Figure 9:
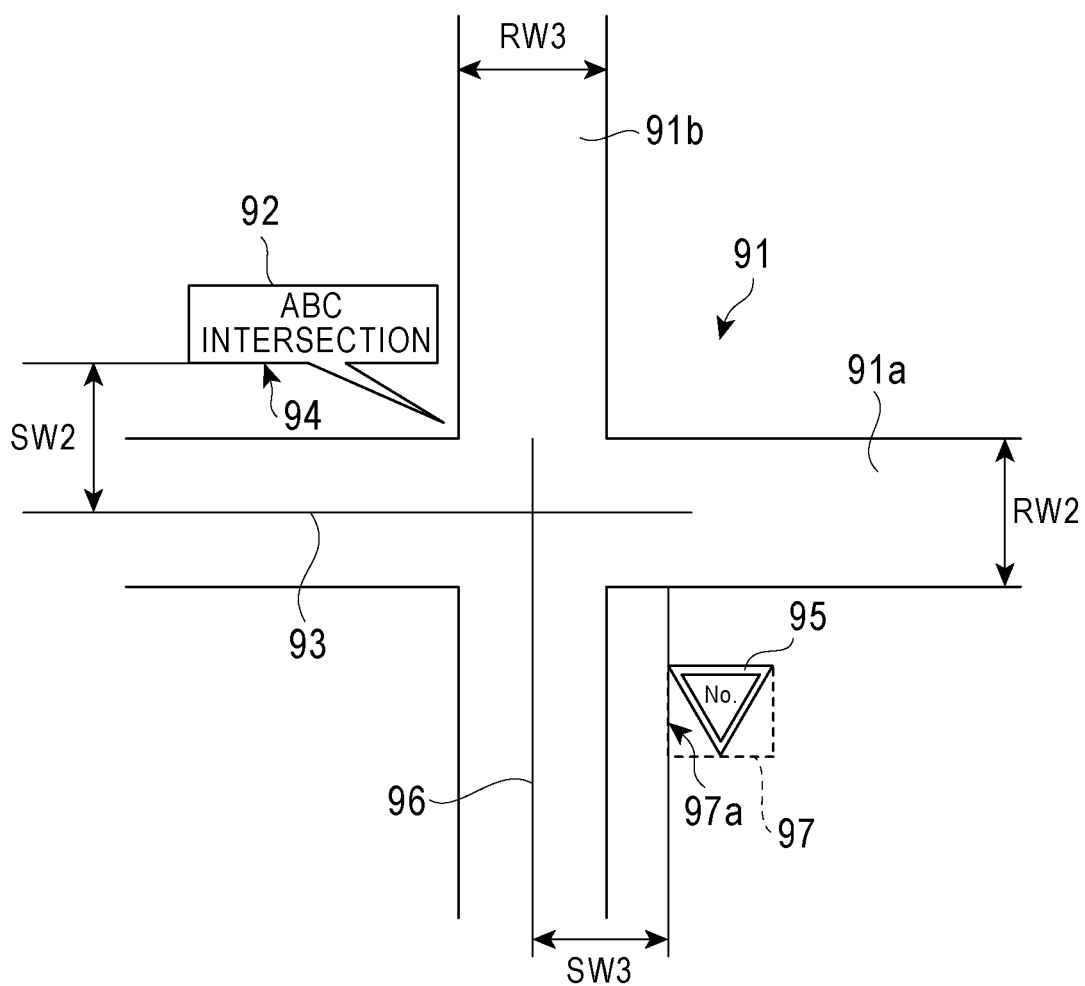
FIG. 9 illustrates a relationship between display positions of roads and display positions of an intersection name and a road sign.

For example, FIG. 9 illustrates an exemplary display of an intersection name and a road sign. FIG. 9 provides an exemplary map display near an intersection 91 where a road 91a (with a road width of RW2) intersects with a road 91b (with a road width of RW3). A balloon-like intersection-name display icon 92 shows an intersection name "ABC intersection" along the road 91a. In this case, a reference line of the road 91a is a center line 93 of the road 91a, and a reference line of the display icon 92 is a side 94 of the display icon 92, the side 94 being parallel to the road 91a that corresponds to the display icon 92 and being near the road 91a. A distance (shift width) SW2 between the center line 93 that is the reference line of the road 91a and the side 94 that is the reference line of the display icon 92 is previously determined. When the display icon 92 is displayed, the display position of the display icon 92 is determined with reference to the shift width SW2.

A road sign icon 95 is displayed along the road 91b. In this case, a reference line of the road 91b is a center line 96 of the road 91b, and a reference line of the road sign icon 95 is a side 97a of the road sign icon 95, the side 97a being parallel to the road 91b and being near the road 91b, from among sides of a rectangular frame 97 that is a virtual outer frame of the road sign icon 95.

A distance (shift width) SW3 between the center line 96 that is the reference line of the road 91b and the side 97a that is the reference line of the road sign icon 95 are previously determined. When the road sign icon 95 is displayed, the display position of the road sign icon 95 is determined with reference to the shift width SW3.

While preferred embodiments have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the features described above are not necessarily the only features of the invention, and it is not necessarily expected that all of the described features will be achieved with every embodiment of the invention.

What is claimed is:

1. A map display device that displays a map image around a vehicle position, the display device comprising:
a display unit;
a first storage unit configured to store map data including road data of at least one road and road-related information corresponding to the at least one road;
a second storage unit, separate and independent from the first storage unit, configured to store adjustment data defining a relationship between a display position of the road data on the display unit and a display position of the road-related information on the display unit;
a map display control unit configured to calculate a display position of the road-related information corresponding to the road data, based on the adjustment data for an individual road;
the map display control unit configured to display the road-related information on a screen of the display unit relative to an image corresponding to the road data, and configured to adjust a position of the road-related information on the display relative to the image corresponding to the road data without performing updating of the road data on the display, wherein the adjustment of the position of the road-related information eliminates overlap between the road-related information and the road data so as to increase readability of the road-related information on the display unit; and
wherein the adjustment of the position of the road-related information is based on a number of lanes and a road type of the road.

2. The map display device according to claim 1, wherein a road width when the road is displayed on the screen of the display unit is determined based on the number of lanes and the road type of the road.

3. The map display device according to claim 2, wherein the adjustment data is a distance between the display position of the road and the display position of the road-related information, the adjustment data being determined based on the road type and the road width of the road.

4. The map display device according to claim 3, wherein the map display control unit extracts a distance between a reference line for displaying the road-related information based on the road type and the road width of the road and a reference line of the road from the adjustment data stored in the second storage unit, and calculates the display position of the road-related information based on the distance.

5. The map display device according to claim 4, wherein the reference line for displaying the road-related information is a center line of a display frame for a region in which the road-related information is displayed, the center line being substantially parallel to the road that corresponds to the display frame.

6. The map display device according to claim 5, wherein the reference line of the road is a center line of the road.

7. The map display device according to claim 5, wherein the reference line of the road is a side of the road, the side being substantially parallel to the display frame and being near the display frame.

8. The map display device according to claim 4, wherein the reference line for displaying the road-related information is a side of a display frame for a region in which the road-related information is displayed, the side being substantially parallel to the road that corresponds to the display frame and being near the road.

9. The map display device according to claim 1, wherein the road-related information is one a group consisting of a street name, an intersection name, and a road sign.

10. A map display method that generates a map image by using map data, the map data including road data of at least one road and road-related information, the road-related information including map character data having a street name corresponding to the at least one road and adjustment data based on a relationship between a display position of the street name and a display position of the at least one road, the method comprising:
detecting a current vehicle position;
extracting the map data for an area around the current vehicle position;
generating a map image, including the road-related information, based on the current vehicle position, and displaying the map image of a screen of a display unit;
acquiring adjustment data based on a relationship between a display position of the road and a display position of road-related information for the road, the road-related information for the road being included in the map data;
calculating an adjusted display position of the road-related information for the road based on the adjustment data; and
displaying an updated map image on the screen based in the adjusted display position to adjust a position of the road-related information on the display relative to the road data without performing updating of the road data on the display, wherein the adjustment of the position of the road-related information eliminates overlap between the road-related information and the road data so as to increase readability of the road-related information on the display unit, and wherein the adjustment of the position of the road-related information is based on a number of lanes and a road type of the road.

11. The map display method according to claim 10, wherein a road width of the road is determined based on the number of lanes and a road type of the road.

12. The map display method according to claim 11, wherein the adjustment data represents a distance between the display position of the road and the display position of the road-related information, the adjustment data being determined in accordance with the road type and the road width of the road.

13. The map display method according to claim 12, wherein the calculation of the display position of the road-related information comprises:
extracting a distance between a reference line for displaying the road-related information in accordance with the road type and the road width of the road and a reference line of the road from the adjustment data stored in a storage unit, and
calculating the display position of the road-related information based on the distance.

14. The map display method according to claim 13, wherein the reference line for displaying the road-related information is a center line of a display frame for a region in which the road-related information is displayed, the center line being substantially parallel to the road that corresponds to the display frame.

15. The map display method according to claim 14, wherein the reference line of the road is a center line of the road.

16. The map display method according to claim 14, wherein the reference line of the road is a side of the road, the side being substantially parallel to the display frame and being near the display frame.

17. The map display method according to claim 13, wherein the reference line for displaying the road-related information is a side of a display frame for a region in which the road-related information is displayed, the side being substantially parallel to the road that corresponds to the display frame and being near the road.

18. The map display method according to claim 10, wherein the road-related information is one of a group consisting of a street name, an intersection name, and a road sign.

* * * * *